Feb. 5, 1952        J. A. WAGNER        2,584,645
SYNCHRONIZING MECHANISM
Filed June 14, 1948        4 Sheets-Sheet 1
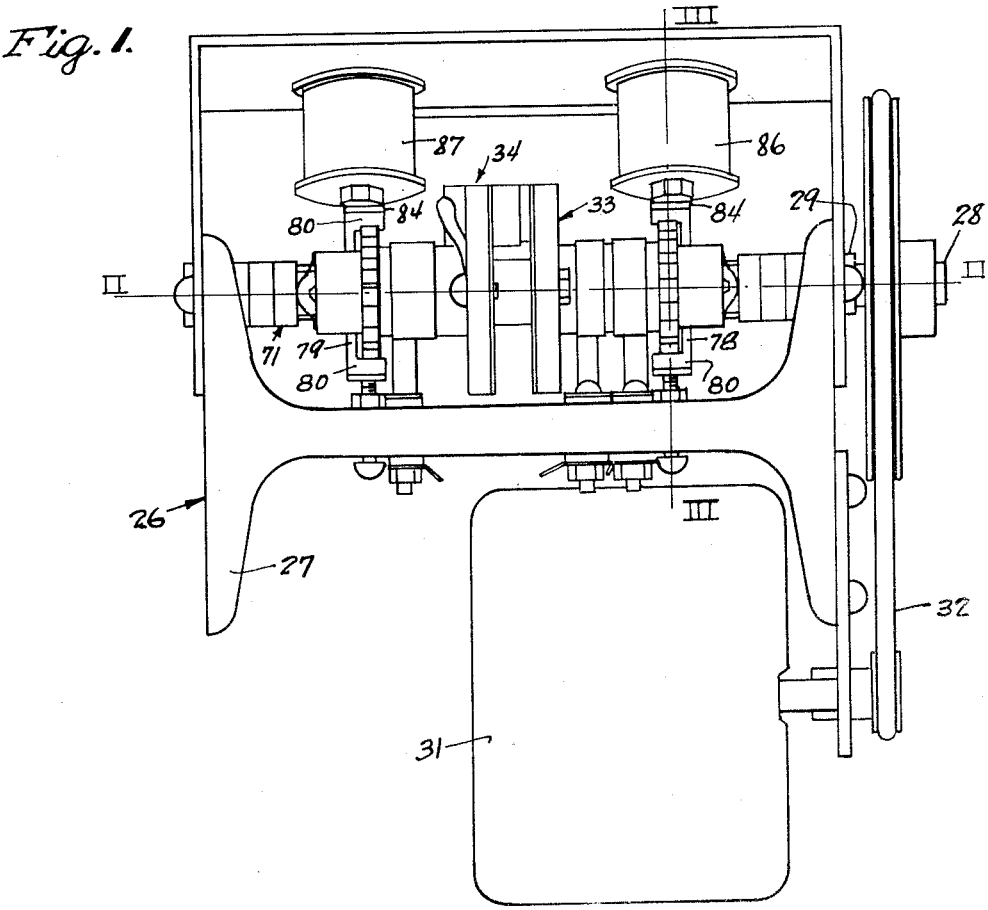
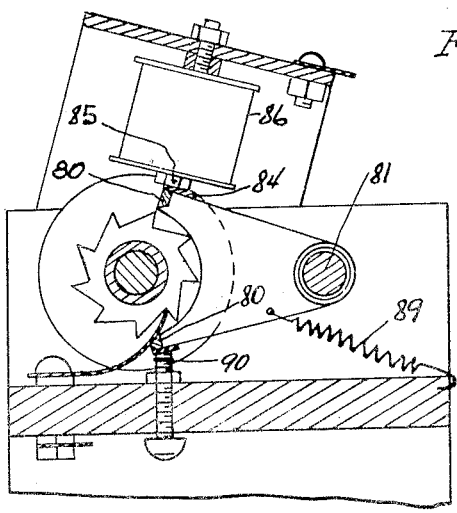
INVENTOR
JOSEPH A. WAGNER
BY Louis J. Letterle
ATTORNEY.

Feb. 5, 1952        J. A. WAGNER        2,584,645
SYNCHRONIZING MECHANISM
Filed June 14, 1948        4 Sheets-Sheet 2
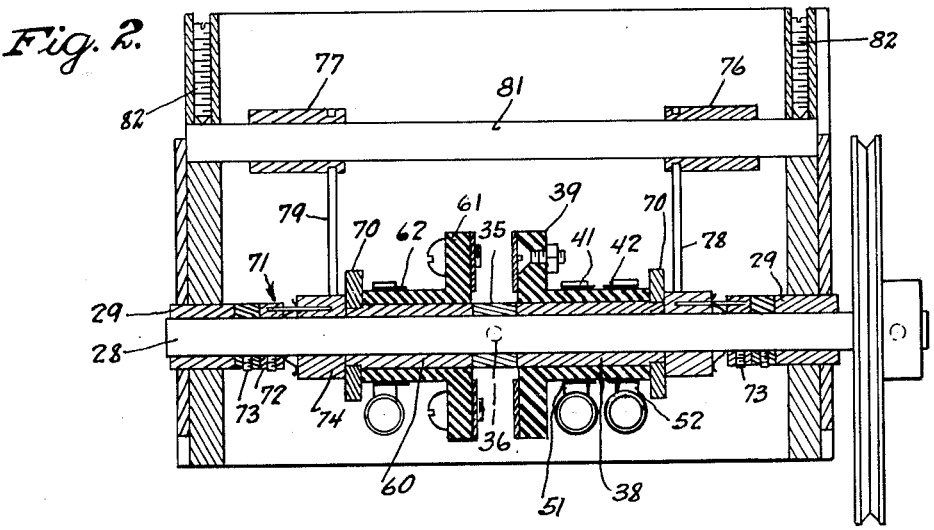
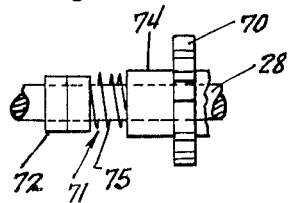
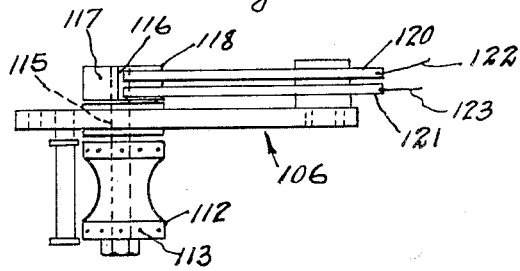
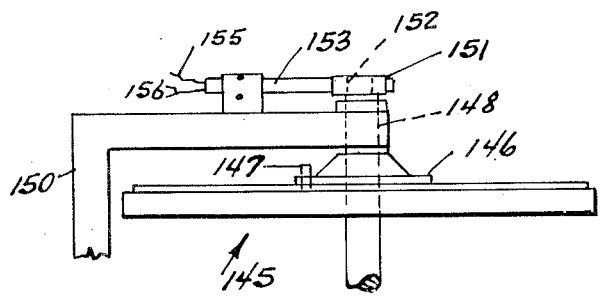
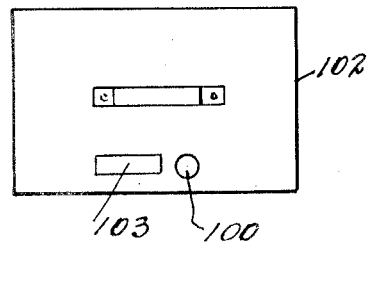
INVENTOR
JOSEPH A. WAGNER
BY Louis J. Letterle
ATTORNEY.

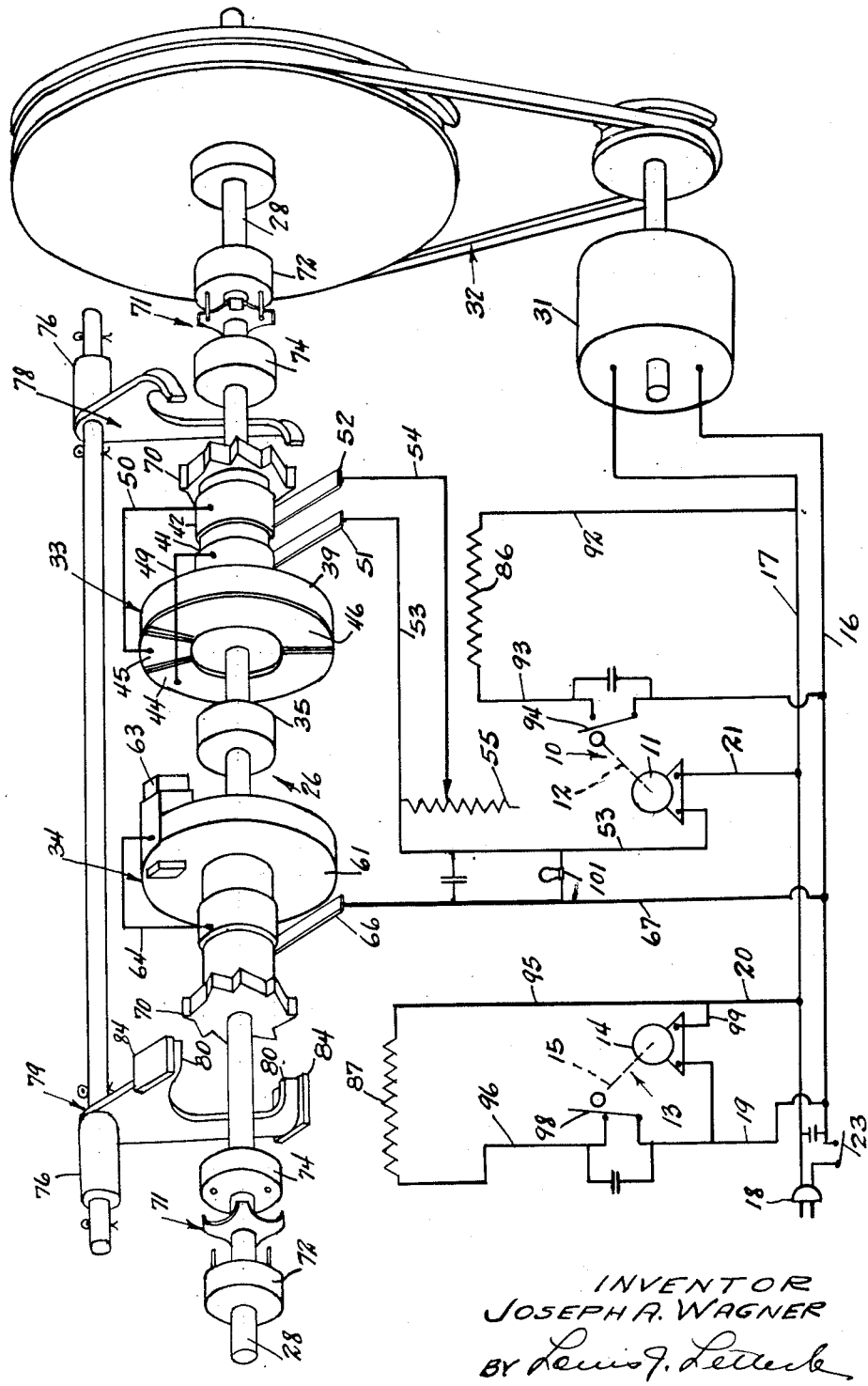

Feb. 5, 1952 J. A. WAGNER 2,584,645
SYNCHRONIZING MECHANISM
Filed June 14, 1948 4 Sheets-Sheet 4

Fig. 6.

INVENTOR
JOSEPH A. WAGNER
BY Louis J. Letterle
ATTORNEY.

Patented Feb. 5, 1952

2,584,645

UNITED STATES PATENT OFFICE 2,584,645

SYNCHRONIZING MECHANISM

Joseph A. Wagner, Verona, Pa., assignor to Wagneradio Company, Verona, Pa., a corporation Application June 14, 1948, Serial No. 32,811

9 Claims. (Cl. 318—74)

1

The invention relates to an apparatus for synchronizing the movement between two machines but it has particular relation to a system for synchronizing a motion picture film, with a sound record made on another medium, such as a phonograph disc.

In the making of sound picture films it is frequently the case that the original sound record and the picture record is first recorded on separate media. If the sound record is to be used as an appropriate accompaniment to the picture, then it is essential that the motor which drives the picture film be governed by the speed at which the sound record is reproduced.

Among the objects of the invention are to put into practice the above mentioned purposes, the invention further comprehending the use of a picture program upon a strip of film in which the film will be automatically moved one frame at a time in synchrony with the beginning of the production on the sound record of sound pertaining to the frame of the picture then being moved into display position, regardless of whether the sound on the sound record be speaking, or other sound effects and in which the shifting of the pictures is controlled automatically by the operation of the sound record or the driving means for the same.

A further object of the invention is to provide a simple, reliable electro-mechanical synchronizing device for operating a plurality of motors synchronously, at constant speed, under control of one of the motors. These and other objects of the invention will be apparent from the following description and the drawings.

In a sound picture control system constructed in accordance with this invention the motion picture machines, and the sound reproducing machine are operated by their own separate motors not only that the machine may be located at any desired distance from each other, but because existing cameras, projectors and sound equipment may be used. The motors operating the motion picture machine and the sound machine are electrically interlocked and are controlled to start in phase and to operate synchronously.

For a better understanding of the invention, reference may now be had to the accompanying drawings, in which:

Fig. 1 is a plan view of a synchronizing apparatus constructed in accordance with the invention.

Fig. 2 is a sectional view of the invention, taken substantially along line 2—2 of Fig. 1.

2

Fig. 3 is a sectional view of the invention, taken substantially along line 3—3 of Fig. 1.

Fig. 4 is an exploded view of an apparatus constructed in accordance with the invention, together with a wiring diagram in its simplest form.

Fig. 5 is a fragmentary elevation view disclosing a clutch structure as used in the invention.

Fig. 6 is a schematic wiring diagram of the invention, when used with a projector or camera and sound apparatus.

Fig. 7 is a plan view of a switching apparatus as used on the projector.

Fig. 8 is an elevation view of a switch as used on the sound apparatus.

Fig. 9 is a plan view of a synchronizing apparatus installed in a case or carrying box.

Referring to the drawings in detail, a projector or motion picture machine 10 is shown connected to a motor 11 by means indicated at 12 and a phonograph or sound reproducing machine 13 is shown connected to a motor 14 by means of shaft 15. The motors 11 and 14 are interconnected to a source of power, not shown, by wires 16, 17 and plug 18, through wires 19, 20, 21 and switch 23. In accordance with the invention, the speed of the shaft driven by motor 11, is controlled at a constant value with respect to the speed of the shaft driven by the motor 14.

To accomplish this, as shown in Figures 1 to 4, a mechanism 26, having a frame 27 is provided with a shaft 28, mounted in suitable bearings 29, and driven by means of a motor 31, through a belt drive 32. Mounted on the shaft 28, intermediate the ends thereof is a two part rotatable switch, formed of a switch element 33 and a switch element 34, separated by a collar 35, secured to the shaft by set screw 36. The switch element 33 is formed with a bushing 38 rotatably mounted on the shaft and supporting a nonconducting element 39, on which are mounted slip rings 41 and 42.

Secured to one face of the element 39 are conductor elements 44 and 45, and non-conducting element 46, formed in segments to provide substantially, an annular member, with element 45 being substantially smaller than the contact 44, or the element 46. An electrical wire 49, operatively connects segment 44 to slip ring 41 and wire 50 connects segment 45 to slip ring 42. Brushes 51 and 52 are provided in contact relation with rings 41 and 42 respectively, and these in turn are connected to the rheostat 55, through wires 53 and 54, with wire 53 extending to one terminal of motor 11.

The switch element 34 is formed with a bushing 60, rotatably mounted on the shaft and supporting a nonconducting element 61, on which is mounted a slip ring 62. Mounted on the member 61 is an arm or brush 63, having wire 64 connected to the slip ring 62. A brush 66 is provided in contact relation with slip ring 62 and brush 66 is connected to power line 16, through wire 67.

Mounted on the bushings 38 and 60, are gears 70, forming a part of elements 33 and 34 which are rotatably driven with shaft 28 by means of slipping clutches 71, which may be of the so called pin type, as shown in Figure 2, or they may be formed with a collar 72 rigidly secured to the shaft 28 by screws 73 and a pressure member 74, driven by a coil spring 75, disposed between and attached to, the collar 72 and the member 74.

With the motor 31 in operation, shaft 28 turns and switch elements 33 and 34 rotate until limited by projections 80 on escapement members 78 and 79 respectively, said escapements being so constructed that one or the other of the projections 80, on each escapement is at all times in position to limit the rotation of the respective escapement gear 70, thus limiting the rotation of the assemblies 33 and 34. Due to the action of the clutches 71, the motor 31 and the shaft 28 continue to rotate imparting motion to the elements 33 and 34 only upon the displacement of the respective escapements. The escapements 78 and 79 are each free to turn on a shaft 81, which is secured in the frame 27, by screws 82, with members 78 and 79 secured in position by means of cotter pins or the like. Each member 78 and 79 is provided, at its extremities, with a plate 84 adapted to engage the face of magnets 86 and 87. Stops 90 are provided to limit the downward movement of the escapements. Upon energizing a magnet, the plate 84 moves into engagement with the face 85, as shown in Fig. 3 and upon de-energizing the magnet the escapement is returned to the original position by a spring 89. This position is determined by the stops 90. In the action of the escapement, the assemblies 33 and 34 rotate the distance of one tooth upon energizing or de-energizing of the respective magnets. No motion is imparted to the gear by the movement of the escapement, the latter serving only to limit and control the motion as imparted to the assemblies 33 and 34, through the clutches 71 by the rotating shaft 28.

The magnet 86 is operatively connected to the lines 16 and 17, by means of wires 92 and 93 through switch 94, actuated by motor 11, with magnet 87 connected to lines 16 and 17 by means of wires 19, 20, 95 and 96, through a switch 98, actuated by motor 14. The rheostat 55 is provided with a knob 100 for manual adjustment in phasing the synchronizing apparatus and synchronism is indicated by a lamp 101 connected to the electrical circuit. As shown in Figure 9 the adjustment for phasing the synchronizing apparatus, may be installed on the outside of a container or carrying case 102, having an opening 103 for the lamp 101.

To assist in visualizing the operation of the invention in its simplest form, as shown in Figure 4, in which no provision has been made for phasing, the plug 18 is connected to a source of power (not shown), switch 23 is closed, starting motor 31, which rotates shaft 28 and the switch members 33 and 34, by means of the clutch members 71.

The motor 14 also starts, opening and closing the switch 98, which in turn energizes or de-energizes magnet 87. This allows the member 34 to rotate 1/9 of a revolution, when employing an escapement gear with the number of teeth as shown in the drawings, for each closing and opening of the switch 98. If the brush 63 is positioned in contact with element 45, the motor 11 will start with motor 14, through circuit including rheostat 55. Should brush 63 contact the element 46 when motor 14 is started, motor 11 will not operate, until brush 63 as rotated with element 34, contacts element 45. However if brush 63 contacts element 44 on starting of motor 14, motor 11 will operate, turning 33 at a greater rate of speed than that of 34, until the contact brush 63 engages the element 45, reducing the speed of the motor 11, due to the resistance of the rheostat 55 in the circuit. With motor 11 operating the shaft 12 closes and opens switch 94, energizing and de-energizing magnet 86. This allows the member 33 to rotate 1/9 of a revolution for each closing and opening of the switch 94, when employing an escapement gear with the number of teeth as shown in the drawings.

In practicing the invention, as shown in Figure 6, the projector or motion picture machine 10, having a film 105, driven by a motor 11 through the shaft 12 is provided with a switch 106. In the embodiment of the invention as shown, the film 105, mounted on reel 107 is threaded over sprocket 108, thence past the film gate of the machine, over sprocket 110 and wound on take-up reel 111. Sprockets 108, 110 and take-up reel 111 are all driven by motor 11 through shaft 12. The switch 106 is positioned between the film gate and the sprocket 110 and is formed of a sprocket 112 with projections 113. The sprocket 112, mounted on a shaft 115 is rotated by the travel of the film 105, through the machine 10. As shown in Figure 7, the other end of the shaft 115 supports a contact roller 116, a portion of which is formed with an electrical conductor surface 117 and a non-conducting surface 118.

One end of the contact brushes 120 and 121, engage the contact roller 116, while the other ends thereof are connected to wires 122 and 123 respectively. Wires 122 and 123 are connected to the poles a and b of a four pole plug 125, with one end of the conductor 126 connected to pole c of the plug and the other end connected to the motor 11. One end of conductor 127 connects to pole d of plug 125, while the other end connects to plug 132. The other terminal of motor 11 is connected to plug 132 by wire 130. The plug 132 is connected to wires 16 and 17 by conductors 133, 134, and switch 135.

A sound recorder or phonograph 138, having a turntable 139, the speed of which controls the speed of the motor 11 is provided with a shaft 15, driven by the motor 14, having wires 141 and 142 connected to poles a and b of a four pole plug 143. A switch 145, as shown in detail in Figure 8, formed with a member 146 provided with an opening for a pin 147 engaging the record is mounted on one end of a shaft 148, mounted on the arm 150. Attached to the other end of the shaft 148 is a cam 151 adapted to engage a roller 152, operating contact members 153, in a make and break operation. Wires 155 and 156 are connected to the contact members 153 and extend to poles c and d of the plug 143. The motor 14 is connected to the wires 16 and 17 through poles a and b of plug 161, by conductors 159 and 160, through switch 135.

The synchronizing apparatus 26 is interconnected to the projector or camera and record turnable by means of conductor 162 connected at one end to pole a of plug 163 and the other end connected to magnet 86.

One end of a conductor 164 is connected to pole b of the plug 163 and the other end to wire 165, connected to motor 31 and wire 17. Conductor 170 is at one end connected to the pole d of plug 161 and at the other end to magnet 87, while wire 169 connects pole c of the plug 161 to wire 17 through conductor 165. Wire 166, connected to wire 167, extending from magnets 86 to 87, operatively connects motor 31 and the magnets, to wire 16 through wire 173, switch 172, wire 134 and switch 135.

To complete the circuit with motor 11, as shown in Figure 6, the contacts 44 and 63 are provided with wires 175 and 176, connected to wires 177 and 178 respectively. Conductor 177 is connected at one end to pole c of plug 163, while the other end connects a terminal of the lamp 101 through wire 180 to the rheostat 55, while conductor 178 connects pole d of plug 163 and the other terminal of lamp 101. The contact 45 is provided with a wire 179 connecting to the rheostat 55.

In operation, the structure shown in Figure 6 is similar to that described for the apparatus in Figure 4, except that manual phasing of the apparatus is provided. This is accomplished by closing switches 135 and 172, after which rheostat 55 is adjusted until lamp 101 shows a steady, dim light, which indicates that the apparatus is in phase. This is true only when contact arm 63, makes contact with the contact element 45 of the switch element 33. Switch 172 is then opened and when synchronizing apparatus remains in phase, light 101 will remain dim, after which, switch 135 is opened and switch 172 is closed.

The sound record is then positioned on the turntable, with the needle in a previously marked groove and the film threaded in the projector or camera, in the usual manner, but with a start mark in the gate. Switch 135 is now closed, which starts motors 11, 14 and 31 completing circuit to magnets 86 and 87, that are energized by action of the switches 106 and 145 respectively. The remainder of the operation is similar to that as described for the structure shown in Figure 4.

While specific embodiments of the invention have been described to illustrate the application of the principles thereof, it will be understood that the invention may be otherwise embodied, without departing from the principles thereof, or departing from the scope of the appended claims.

What I claim is:

1. A synchronizing system comprising an independently driven, continuously rotated shaft, a two element rotary switch freely mounted on the shaft, the switch elements electrically connected to control the speed of a controlling apparatus with the speed of a controlled apparatus, friction clutches mounted on the shaft, the clutches engaging the elements of the switch for transmitting rotary motion of the shaft to the switch elements, a gear mounted on each of the switch elements, said gears operatively associated with escapements actuated by electromagnets, one electromagnet being energized by the operation of the controlling apparatus, the other electromagent energized by the operation of the controlled apparatus.

2. A synchronizing system comprising an independently driven, continuously rotated shaft, a two element rotary switch mounted on the shaft, the switch electrically connected to control the speed of a controlling apparatus with the speed of a controlled apparatus, friction clutches mounted on the shaft, the clutches engaging the elements of the switch for transmitting rotary motion of the shaft to the switch elements, a gear mounted on each of the switch elements, escapements operatively associated with the gears the escapements being oscillated by electromagnets, one of the electromagnets being energized by electrical impulses provided by the controlling apparatus, the other electromagnet being energized by electrical impulses from the operation of the controlled apparatus, the escapements so positioned with respect to the rotation of the gears that as one pallet of the escapements releases a tooth of the gear, the opposite pallet on the escapement is entering forward of another tooth, thus permitting a travel of one tooth on the gear at each oscillation of the escapement.

3. A synchonizing system comprising an independently driven, continuously rotated shaft, a two element rotary switch freely mounted on the shaft, a pair of friction clutches mounted on the shaft, the clutches engaging the elements of the switch for transmitting rotary motion of the shaft to the switch, means including a gear mounted on each of the switch elements to arrest rotary motion of the switch and electromagnets connected to the above mentioned means to permit rotation of the switch elements with the shaft upon energizing of said electromagnets, one electromagnet being energized by the operation of the controlling apparatus and the other electromagnet being energized by the operation of the controlled apparatus.

4. A synchronizing system comprising an independently driven, continuously rotated shaft, a two element rotary switch freely mounted on the shaft, each of said switch elements formed with an escapement gear, friction clutches mounted on the shaft adjacent each of the switch elements, the rotation of the shaft through the clutches providing torque for said switch elements but providing no rotation of the switch until displacement of an escapement operates the gear, thereby permitting rotation of the switch elements as determined by the number of teeth on each gear, one escapement for each gear, each of said escapements being actuated by electromagnets, one electromagnet electrically connected to a controlling apparatus, the other electromagnet connected to the controlled apparatus, each of the apparatuses to be synchronized having means for providing an equal number of pulses to the electromagnets, when both apparatuses are in synchronism, the two element rotary switch by the displacement of the elements varying an impedance in the circuit of a motor operating one of the apparatuses to be synchronized.

5. A synchronizing system comprising a switch operated by a controlling apparatus, a switch operated by a controlled apparatus, each of the switches connected to provide a series of electrical pulses from each of the apparatuses, a pair of electromagnets, intermittently energized by the two series of pulses, a pair of escapements actuated by the electromagnets, each of the escapements operating one of a pair of gears, a two element rotary control switch operatively associated with the gears, an independently driven, continuously rotated shaft supporting said rotary switch, the rotary motion of the shaft transmitted to the rotary switch elements by means of friction drives, said friction drives rotating each rotary switch element on displacement of its escapement, the drives slipping to permit rotation of the independently driven shaft, at such times as the rotary motion of either rotary switch element is prevented by the escapement, the relative displacement of the rotary switch elements regulating the speed of the apparatus to be controlled.

6. A synchronizing system comprising a switch operated by a controlling apparatus, a switch operated by a controlled apparatus, each of the switches connected to provide a series of electrical pulses from each of the apparatuses, means including a pair of escapements intermittently actuated by the pulses, each of the escapements rotating one of a pair of gears, a two element rotary control switch operatively associated with the gears, an independently driven, continuously rotated shaft supporting said rotary switch elements and gears, the rotary motion of the shaft transmitted to the rotary switch by means of friction drives, said friction drives rotating each rotary switch element on displacement of its escapement, the drives slipping to permit rotation of the independently driven shaft, at such times as the rotary motion of either rotary switch element is prevented by the escapement, the relative displacement of the rotary switch elements regulating the speed of the apparatus to be controlled.

7. A synchronizing system comprising a switch operated by a controlling apparatus, a switch operated by a controlled apparatus, each of the switches electrically connected to a source of power, with each of the switches formed on their respective apparatuses to provide a series of pulses at identical rates when both apparatuses are in synchronism, a pair of electromagnets energized respectively by the two series of pulses, a pair of escapements operated by the electromagnets, each of said escapements when at rest preventing rotation of escapement gears, each of said gears mounted concentric with one element of a two element rotary control switch, an independently driven, continuously rotated shaft supporting the switch elements, a pair of friction clutches mounted on the shaft adjacent the rotary switch elements for transmitting rotary motion to the switch, said clutches rotating each rotary switch element upon displacement of its respective escapement, the clutches slipping to permit continuous rotation of the independently driven shaft, when movement of the rotary switch elements are prevented by the escapements, the rotary switch elements connected into the circuit of the apparatus to be controlled so as to vary an impedance in the circuit of the apparatus to be controlled when said elements are displaced relative to each other about their axis, the rotary switch elements each rotating at a speed as determined by the relative speed at which the controlling and controlled apparatuses are operating, said elements being displaced on change of speed of either of said apparatuses, the displacement providing an impedance change in the circuit of the apparatus being controlled, said impedance change being such as to correct the relative speed of the apparatus causing the displacement.

8. A synchronizing system comprising a switch operated by a controlling apparatus, a switch formed with a roller having a portion of its face provided of non-conducting material, the switch actuated by a controlled apparatus, each of the switches connected to provide a series of electrical pulses from each of the apparatuses, an independently driven, continuously rotated shaft, a two element rotary switch mounted on the shaft for regulating the speed of one of the apparatuses to be synchronized, clutches mounted on the shaft in engagement with the rotary switch elements, for transmitting the rotary motion of the shaft to the rotary switch, means including escapements operatively associated with said rotary switch elements for limiting the rotation of the rotary switch elements, said escapements being actuated by electrical pulses derived from the operation of the apparatuses being synchronized.

9. A synchronizing system comprising a switch operated by a controlling apparatus, a switch formed with a roller having a portion of its face provided with a non-conducting material, the switch actuated by a controlled apparatus, each of the switches connected to provide a series of pulses from each of the apparatuses, a pair of electromagnets energized by the two series of pulses, a pair of escapements actuated by the electromagnets, each of the escapements operating one of a pair of gears, a two element rotary control switch operatively associated with the gears, an independently driven, continuously rotated shaft supporting said rotary switch, the rotary motion of the shaft transmitted to the rotary switch elements by means of friction drives, said friction drives rotating each rotary switch element on displacement of its escapement, the drives slipping to permit rotation of the independently driven shaft, at such times as the rotary motion of either rotary switch element is prevented by the escapement, the relative displacement of the rotary switch elements regulating the speed of the apparatus to be controlled.

JOSEPH A. WAGNER.

REFERENCES CITED

The following references are of record in the file of this patent:

UNITED STATES PATENTS

| Number | Name | Date |
|---|---|---|
| 993,610 | Mathelot et al. | May 30, 1911 |
| 1,210,323 | Janssens | Dec. 26, 1916 |
| 1,362,876 | Kozar | Dec. 21, 1920 |
| 2,394,361 | Bruderlin | Feb. 5, 1946 |